United States Patent [19]

Lang

[11] 4,262,877
[45] * Apr. 21, 1981

[54] SOLENOID FLUID VALVES

[76] Inventor: Gregor L. Lang, 295 East St. S., Suffield, Conn. 06078

[*] Notice: The portion of the term of this patent subsequent to Sep. 6, 1994, has been disclaimed.

[21] Appl. No.: 830,347

[22] Filed: Sep. 2, 1977

Related U.S. Application Data

[63] Continuation of Ser. No. 576,167, May 9, 1975, Pat. No. 4,046,351, which is a continuation of Ser. No. 215,052, Jan. 3, 1972, abandoned, which is a continuation-in-part of Ser. No. 830,342, Jun. 4, 1969, Pat. No. 3,647,177.

[51] Int. Cl.³ .................... F16K 31/06; H01F 7/13
[52] U.S. Cl. .................... 251/141; 251/129; 335/244; 335/262
[58] Field of Search ........... 251/129, 141; 137/606; 335/243, 244

[56] References Cited

U.S. PATENT DOCUMENTS

| 959,618 | 5/1910 | Schmidt | 251/129 X |
|---|---|---|---|
| 1,664,613 | 4/1928 | French | 251/139 |
| 2,544,209 | 3/1951 | Wolcott | 251/141 X |
| 2,629,766 | 2/1953 | Vargo | 251/141 X |
| 2,853,659 | 9/1958 | Herlon | 251/141 X |
| 2,863,628 | 12/1958 | Rimsha et al. | 251/141 X |
| 2,888,237 | 5/1959 | Dahl | 251/141 X |
| 3,082,359 | 3/1963 | Mangiafico et al. | 251/141 X |
| 3,235,223 | 2/1966 | Wintress | 251/141 |
| 3,262,027 | 7/1966 | Zaleske et al. | 251/141 X |
| 3,512,749 | 5/1970 | Noakes et al. | 251/141 X |

FOREIGN PATENT DOCUMENTS

166213   7/1921   United Kingdom .................... 335/243

*Primary Examiner*—Arnold Rosenthal

[57] ABSTRACT

A solenoid valve wherein a conical tip of a cylindrical plunger armature seals a flow-limiting orifice in an elastic valve-seat annulus, enabling minimum armature travel per unit of flow. The resulting short-gap combined with a thin-walled armature housing and an efficient unitary exterior magnetic yoke yields a low reluctance magnetic circuit and a high impedance characteristic. Wattage demand is reduced in both inrush and steady-state conditions. Choice of gap dimension and annulus design and arrangement enables a low wattage demand substantially free from variable fluid pressure effects. The use in combination of a unitary dual-path exterior magnetic loop, with a ferrous armature housing, and a novel phase-splitting core enable operation at still further reduced wattage values. Size, copper usage, temperature rise and cost are held to low values previously unattainable.

2 Claims, 3 Drawing Figures

SOLENOID FLUID VALVES

BACKGROUND OF THE INVENTION

This is a continuation of co-pending application Ser. No. 576,167 for Alternating Current Solenoids, filed May 9, 1975, now U.S. Pat. No. 4,046,351 which is a continuation of prior co-pending application Ser. No. 215,052 for Alternating Current Solenoids filed Jan. 3, 1972, divided and now abandoned, which in its turn is a continuation-in-part of prior co-pending application Ser. No. 830,342 for Alternating Current Solenoids filed June 4, 1969, now U.S. Pat. No. 3,647,177, which again in turn contains subject matter in common with co-pending application Ser. No. 783,035 for Phase Splitting Core for Electromagnetic devices filed Dec. 11, 1968, now U.S. Pat. No. 3,553,618. The above division of abandoned application Ser. No. 215,052 is presently co-pending application Ser. No. 570,215, filed Apr. 21, 1975, Alternating Current Solenoids. Additionally thereto, this application and sequential parents hereof including Ser. No. 783,035, and Ser. No. 830,342 contain subject matter in common with application co-pending therewith No. 103,429 for Alternating Current Relays fld. Jan. 4, 1971, now U.S. Pat. No. 3,735,301.

This invention relates to alternating current solenoids or electromagnets useful in solenoid devices such as relays, actuators, and particularly in magnetic flow control valves of the type used to control the flow of gases or liquids under pressure in a closed system, and for convenience of illustration is shown and described herein as applied thereto.

In the design of solenoid fluid control valves it has been common practice to provide a cylindrical plunger guide or cup member of non-magnetic material to serve as a housing for the movable valve plunger and a normalizing bias spring. The housing with appropriate gasketed assembly to the valve body, confines within the cup whatever fluid is controlled by the valve. Such constructions are often referred to as "wet armature" valves. The exciting coil is provided with a magnetic yoke or shell and cylindrical or tubular pole pieces designed to conduct the flux to the vicinity of the plunger housing with a minimum of gaps or magnetic discontinuities, to thereby attain a relatively high magnetic efficiency. The coil is commonly assembled about the housing such that when energized the flux path is through the wall of the non-magnetic housing and the plunger-armature.

The foregoing non-magnetic material interposed between the plunger and pole members precludes attainment of a truly closed magnetic circuit. The housing wall thickness forms plural gaps across which the flux must pass, on entering and leaving the armature. It is necessary that the housing be of appreciable wall thickness to withstand the fluid or hydraulic forces often encountered, a typical brass or bronze housing being 0.026" thick for a fluid pressure of 125 P.S.I.

Any such interruption of an otherwise closed magnetic circuit has the twofold effect of causing major reduction of solenoid impedance, and in total flux flowing in the system. Thus for a given applied voltage, high current will flow, coupled with a major weakening of the mechanical pull force attained by the armature. Ring-shaded poles are ineffective across an interposed gap, which has caused wide usage of long-stroke solenoids having tubular poles, thus adding further to the foregoing power loss difficulties. High-input wattage, rapid temperature rise, and frequent need for resort to intermittent duty ratings have been commonly accepted as unavoidable incidences of wet armature valve constructions heretofore available.

Efforts to overcome those limitations have included the use of high strength non-magnetic materials such as 18-8 stainless steel for thinner housing wall construction, and also at increased manufacturing cost, the use of immersed magnetic poles provided with annular shading rings. But these methods alone have provided only slight gains in electro-magnetic efficiency. The problem is clearly one of reducing or eliminating the armature series gap; of providing a short-stroke armature characteristic; and of reducing the susceptibility of the solenoid structure to the power loss and heating effects of induced circulating or eddy currents.

SUMMARY OF THE INVENTION

In accordance with this invention I have found that in fluid control valves of the present type, the cup or guide housing the armature may be constructed of ferro-magnetic material such as A.I.S.I. type 430 stainless steel, chosen from the group known as "straight chrome ferritic." This material enables the design of thin wall housings of adequate strength to withstand fluid pressure of the order of ten atmospheres or more. The use of a magnetic material virtually eliminates the magnetic series gap invariably present in previous wet-armature valve construction. Moreover, the thin-walled housing in combination with a piston-like armature and a highly efficient unitary exterior magnetic shell yields a solenoid structure of low reluctance with a consequent high flux value flowing in the core and armature. Exciting magnetomotive force and input wattage requirements are therefore diminished, for a given initial 'unporting' load or steady state holding load.

An axial valve stem integral with the armature has a conical tip arranged for sealing engagement with a fluid orifice in a resilient valve seat annulus. The orifice and associated fluid duct serve a flow limiting function, the diameters thereof varying in accordance with the intended fluid pressure and flow rate. The conical tip cooperates with the small diameter orifice hereby provided to place upon the armature a minimum of fluid load or "unporting" pull force. It thus enables a short-stroke solenoid of relatively high electrical impedance value. Transient inrush current, and steady-state energized input wattage are correspondingly reduced for a given fluid pressure and flow rate.

STATEMENT OF INVENTION

The foregoing elements of novelty taken separately or in combination, have the effect of reducing or eliminating the magnetic gaps or reluctances invariably encountered in previous wet-armature valves, with the resultant large increase in total flux, and in flux linking the armature. Eddy-current heat losses are reduced, and fluid loads on the armature are greatly reduced, for a given unit fluid pressure, and flow rate. The attainable decrease in current values, input wattage, and temperature rise enable major savings in weight, size, and cost of the copper winding and solenoid structure required for a given fluid load and flow rate.

It is accordingly an important object of the present invention to provide for a fluid control valve of the immersed armature type, a solenoid construction having an essentially "gapless" or closed magnetic circuit with resulting improvement, at reduced cost, in electromagnetic efficiency and mechanical force attained by the armature, for a given electrical input.

Another object is to provide for a magnetic fluid valve of the above type, a construction wherein for a given fluid load on the armature, the required electrical power is reduced whereby the usage of copper in the solenoid winding may be greatly reduced.

Another object is to provide for a magnetic valve of the above type, a solenoid and magnetic circuit construction of new and novel character such that the required electrical input power per unit of fluid pressure or of fluid flow is decreased, whereby the heat dissipation and time rate of temperature rise of said solenoid is reduced over prior constructions.

A further object is to provide for a magnetic fluid valve of the immersed armature type, a solenoid and magnetic circuit of new and novel character enabling increased armature force, and increased fluid loads, pressures, and flow rates, for a given value of electrical input power.

An additional object is to provide a solenoid construction wherein a housing or guide for the armature is constructed of ferro-magnetic material whereby the distribution of magnetic flux in and around the armature is modified to yield an improved force-versus-distance characteristic, to thereby increase the wide gap transient inrush pull value attained by the armature.

Yet another object is the provision of a solenoid plunger armature in a closely fitting cylinder housing which is characterized by a motion inhibiting piston dash-pot effect, which serves to reduce the tendency of the valve to produce hydraulic noise or water-hammer effects. When the valve is utilized for liquid flow control, the damping effect reduces the need for magnetic phase-splitting means to avoid magnetic noise or "buzz."

Another important object is to provide in a fluid flow control valve a combination construction wherein an axially movable valve member cooperates with a small diameter fluid orifice having flowlimiting properties, thereby enabling a short-stroke solenoid construction having an inherently high electrical impedance characteristic, thus enabling operation at low current and wattage levels.

BRIEF DESCRIPTION OF THE DRAWING

The foregoing and other objects and advantages of the invention will become apparent from the following description, and the accompanying drawings of a preferred embodiment, in which.

PRINCIPLES OF OPERATION

Figure 1:
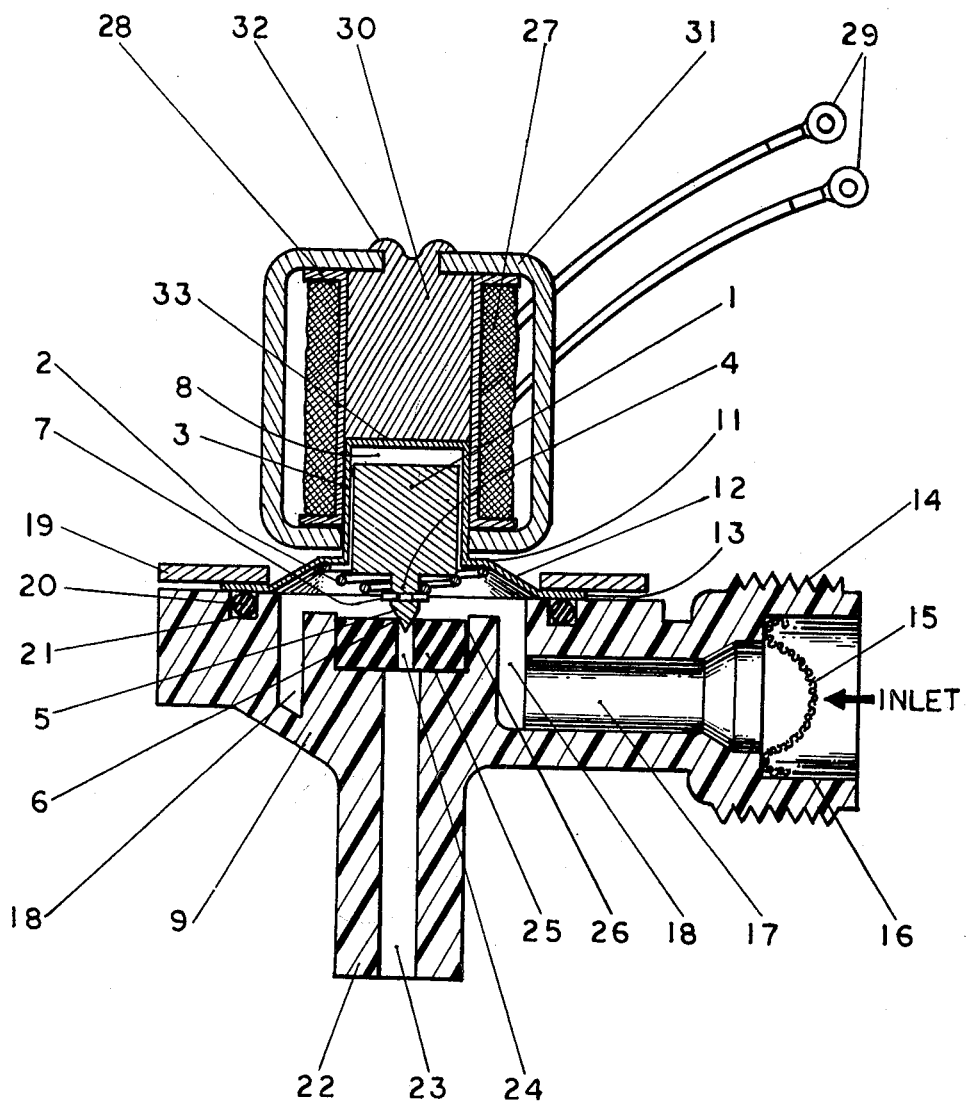
FIG. 1 is a median sectioned view of a fluid valve embodying solenoid and flow controlling elements according to this invention.

Wet armature valve constructions heretofore available were presumably based on the premise that the use of magnetic material as an armature or plunger housing would act adversely as a magnetic shunt, bypassing a large portion of the available flux, thus reducing the tractive force exerted by the plunger.

A basis of this invention is my discovery that a valve solenoid having an armature housing constructed of ferro-magnetic material of relatively thin wall section behaves in an unexpectedly opposite manner to that previously postulated. The magnetic pulling force per unit of input power is greatly increased over the values attainable with the use of non-magnetic armature housings.

This apparently anomalous behavior is explainable; first by the virtual elimination of the dual magnetic gaps, with a major increase in flux flowing in the magnetic circuit due to decrease in the reluctance thereof; and secondly by the fact that pole-to-pole shunting of flux by the housing wall has a limited adverse effect because the thin ferro-magnetic housing wall becomes saturated at relatively low values of flux. As a result of the above saturation effect, the predominant balance of the available flux therefore flows through the best alternate magnetic path which in the present case is represented by the plunger armature, as will be hereafter described.

I have ascertained that the relatively small loss of flux due to parallel shunting by the housing wall is more than compensated by the large increase in total magnetic flux due to the above mentioned elimination of the housing-wall gaps. The resulting tradeoff yields a substantial net gain in armature force available per unit of electrical input power. I have observed gains in excess of 100% during tests of the present invention.

The combination of an armature and a closely fitted ferro-magnetic housing yields a substantial further benefit whereby the armature stroke vs. force characteristic is modified in a manner favoring the initial, or wide-gap pull value. This is a desirable characteristic in fluid valve usage, and in some other applications. This effect is believed explainable as a modification of flux distribution in and about the armature by the close proximity of my ferro-magnetic housing, with said flux distribution varying progressively from the initial or open-gap armature position, to the sealed or closed gap position.

A widely recognized principle of magnetic circuit design where low magnetic reluctance is sought, is the iron-torus core. It is a simple iron ring of generous cross-section, the exciting coil being wrapped about an arcuate portion thereof. The ring has no joints or iron-to-iron junctions transverse to the flux path. All such junctions introduced an inherent cumulative reluctance or demagnetizing force, offsetting a portion of the available exciting m.m.f. Such junctions should be held to the practical minimum for assembly.

In A.C. usage, such a torus is subject to undesirable heat rise and watt-loss caused by induced eddy-currents flowing throughout its cross section. This detriment may be largely avoided by lamination, the torus being sub-divided into a stacked series of laminar iron rings totaling the cross-sectional area of the original. A useful first-approximation of the foregoing is to divide the torus into two equal rings arranged in a "figure eight" manner, with the coil wrapped through the two rings in the area of tangency. This establishes two separate magnetically parallel flux pathe of reduced eddy-current susceptibility, with the fluxes therein flowing in magnetic confluence through the common exciting coil.

My magnetic circuit including the unitary magnetic shell as disclosed herein embodys the substance of the foregoing two paragraphs in a novel form which is simple, low in manufacturing cost, and of high magnetic efficiency suitable for alternating current use.

The flow controlling or valving arrangement as disclosed herein has an important bearing on the electrical and magnetic performance of the solenoid portion of the device. The resilient valve-seat member has a flow passage therethrough of the smallest diameter appropriate to the desired fluid pressure and flow rate, thus serving a flow limiting function. The conical valve member seals the small orifice thus provided with a minimum depth of entry thereinto for any given flow capacity or rate. The deenergized armature polar gap may thus be held to the smallest axial dimension consistent with a given or chosen flow rate, enabling a high reactance or high impedance solenoid characteristic. Open gap inrush current values are thereby reduced, enabling construction of the exciting coil with copper wire or reduced gauge, and with a reduced number of convolutions for a given flow capacity and exciting line voltage. An important saving of copper wire usage and cost, is enabled by this element of novelty.

The small orifice arrangement above described has a major effect on solenoid size, input wattage, and pull force required. The maximum open gap or initial pull force required is the sum of the bias spring force and the fluid pressure load operating on the valve plunger in a sealing direction. This fluid "unporting" force is numerically the product of the orifice area and the net unit differential fluid pressure operating on that area. It follows that for a given fluid pressure, the unporting force varies linearly with orifice area, or proportional to the square of orifice diameter. It is thus apparent that the use of a minimum orifice size consistent with a given flow requirement enables avoidance of excessive armature pull, and input wattage requirements.

The foregoing relationship is valid for a resilient valve-seat annulus arranged for a fixed orifice size as shown, or as arranged for a pressure-distortable variable orifice flow control function commonly applied in solenoid valves of the present usage or type.

U.S. Pat. No. 2,454,929 issued Nov. 30, 1948 discloses a typical prior art arrangement for obtaining the variable orifice or constant flow rate function by a simple modification of the annular cavity wherein the resilient annulus is seated.

It will be apparent to those skilled in the art that many changes may be made in the arrangement of parts and details of construction of the solenoid devices described herein without departing from the spirit of the invention as expressed in the appended claims. Moreover, it will be understood that the applications shown as applied to flow controlling fluid valves are by way of illustration only, and that the several advantages of the invention are applicable to other solenoid devices such as relays and clutches, as well as to hermetically sealed and explosion-proof solenoid actuated devices requiring a vapor or fluid barrier.

DESCRIPTION OF THE PREFERRED EMBODIMENT

Referring more particularly to the drawings wherein similar reference characters designate corresponding parts throughout the various views; FIG. 1 is a median sectional view of a solenoid flow control valve according to the present invention in which cylindrical armature 1, and bias spring 2, are enclosed by armature housing 3, said housing being optionally constructed of ferro-magnetic or non-magnetic material, and so dimensioned as to permit free axially slidable motion therein by plunger armature 1. Armature 1 is formed with a projecting "pintle" or valve-stem portion 4 having at its lower end an integrally formed conical valve portion 5 designed to enter and seal fluid orifice 6, under the influence of bias spring 2, when the valve is deenergized.

Spring 2 is of the conical compression type having its large diameter upper end supported by annular shoulder 11 formed in housing member 3, and having its small diameter lower end engaged with valve stem 4, by snap-ring 7, or other suitable means. Compression spring 2 thus biases armature 1 in a downward direction to seal orifice 6 when the solenoid is deenergized. When so biased the upper surface of armature 1 is separated from the inner abutting surface of housing guide cup 3, thus forming working gap 8 which allows upward motion of armature 1, when the solenoid is energized.

Valve body 9, formed from plastic or metal is provided with inlet pipe fitting 14 and outlet tubular duct 22, which are connected by integrally formed internal fluid passages with the appropriate sides of the valve seat means 25. Inlet 14 is provided with an annular recess 16 adapted to receive domed wire mesh inlet strainer 15 which serves to prevent fluid borne particulate matter from entering the valve. Inlet 4 is connected by fluid duct 17 to annular fluid channel 18, whereby the incoming fluid is conducted to the pressure fluid chamber formed by the inside of the conical portion of plunger housing 3. The peripheral flange portion 13 of housing 3 is pressed into sealing contact with elastic sealing ring 20 by the downward force exerted on annular pressure plate 19 by a number of appropriately spaced assembly screws, not shown. Fluid seal ring 20 formed of an elastomer is seated in annular channel 21 formed in valve body 9. Elastic ring 20 thus forms a compressibly formed seal which confines the pressurized incoming fluid to the inside of said pressure chamber.

Outlet fitting 22 is formed by a downward projecting portion of valve body 9, generally tubular in form and positioned coaxial with armature plunger 1. Outlet fluid duct 23 extends upward to connect with fluid passage 24 which passes vertically through annular valve seat member 25. Valve member 25 is molded of elastomeric material and is dimensioned to fit snugly in annular recess 26 formed in valve body 9 coaxial with fluid duct 23, and forming the upper extremity thereof. Fluid orifice 6 forms the valve seat proper, being normally sealed by the engagement thereagainst of valve cone 5, when the valve is deenergized. Fluid passage 24 forms a flow limiting restriction, the diameter being appropriate to the fluid pressure, viscosity, and flow rate desired.

The magnetic solenoid is assembled over the cylindrical cup portion of housing 3, coaxial therewith. The solenoid is comprised of copper winding 27 on insulating spool 28, and is connected to the external power source by terminals or leads 29. The winding encloses soft iron core piece 30, and is enclosed by mild steel magnetic outer shell 31 to which core piece 30 is attached at top center 32. Outer shell 31 is formed from an elongated rectangular strip of mild steel formed into a closed box-like rectangular loop having the line of abutment of the strip ends at top center, substantially at the axis of core piece 30, as described elsewhere herein. The abutting engagement may be mechanically retained by suitable means such as a locking dovetail, or spot welding of the corners, but should preferably not be through welded the full length of the abutment. Magnetic shell 31 has in its lower surface a bore or hole dimensioned to fit snugly over the cylindrical cup portion of housing 3 which extends into the winding spool 26 to abut the lower end of core 30, thus completing the magnetic circuit linking solenoid 27 in an effectively closed manner. A dimensional length of core 30 equal to 75% of the length of solenoid winding has yielded favorable results in tests of the present invention.

FIG. 1 depicts the valve in the deenergized state with armature 1 in the downward position thus forming axial gap 8 separating armature 1 from the diaphragm portion 33 of housing 3. When housing 3 is constructed of ferromagnetic material such as A.I.S.I. 430 stainless steel, a high value of performance is obtained, the mode of operation being postulated as follows: Upon energization, the magnetomotive force deriving from the current flowing in solenoid 27 gives rise to a concentration of flux flowing axially in the thin cylindrical wall of housing 3, with a resulting saturation of the wall in the area surrounding gap 8. The excess of available flux beyoun dte saturation level is thus diverted radially through the wall of housing 3, thence axially through armature 1, across gap 8, and through diaphragm 33 to core 30. The armature develops a pulling force causing it to rise, compressing spring 2, opening passage 24, allowing fluid flow therethrough.

It can be noted that the upward travel of armature 1 causes working gap 8 to vanish, with the previous gap space then becoming occupied by the upper portion of armature 1. Thus is completed a low reluctance link in the solenoid magnetic circuit of relatively large cross-section and low susceptibility to saturation, with the solenoid reactance rising to a relatively high value. A result is re-distribution of flux whereby the greater part of the flux flows axially through armature 1, the lesser remainder flowing axially in the thin housing wall in the area encircling gap 8. A majority of the available flux thus flows through armature 1 under both open-gap inrush, and closed-gap steady-state conditions.

It is therefore postulated that the housing wall operates in two differing and sequential magnetic states, varied by the motion or position of armature 1, acting as a magnetic switch. The housing wall becomes saturated by the high inrush current at energization followed by transition into a less saturated state as armature 1 reaches the full stroke or zero-gap position, with flux re-distributing and with coil current dropping to the lower steady state value. Both states result in the flow of major fractions of the total flux into and through the armature thereby causing it to develop usefully high values of mechanical pulling force.

The arrangement of armature 1 with a closely fitted housing 3, as disclosed in FIG. 1 provides further functional benefits resulting from an inherent dash-pot liquid damping effect. Said damping serves to reduce the tendency of the alternating magnetic flux to produce intermittent pull-forces, and buzzing sounds, when phase-splitting means are not employed, as in FIG. 1 wherein core piece 30 is of the solid cylindrical type. The diametral clearance between armature 1 and housing 3 may be varied to control the damping and rate of movement of armature 1, as the controlled fluid enters and exits gap space 8.

The force and rate of bias spring 2 is an important design factor, since spring force and the above mentioned armature diametral clearance are basic in determining the rate at which armature 1 will move downward after deenergization of solenoid 27 The above damping effect may be further modified for fluids of varying viscosity by providing an axially aligned fluid passage through armature 1, or by providing axially aligned leakage grooves in the periphery of the armature. The fluid damping serves to reduce hydraulic hammer or other fluid surge and transient effects arising from unduly rapid armature motion.

Figure 2:
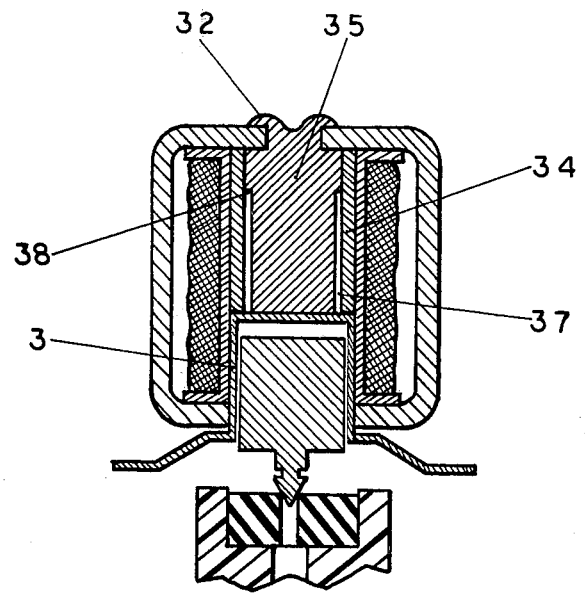
FIG. 2 is a median sectioned view of an alternative solenoid construction according to my prior application Ser. No. 783,035, now U.S. Pat. No. 3,553,618 for "Phase Splitting Core," in combination herewith.

FIG. 2 depicts a solenoid construction in which a phase-splitting core of a self shading class disclosed in my U.S. Pat. No. 3,553,618 is employed in lieu of the solid cylindrical core 30, of FIG. 1. This combination yields a further major improvement in magnetic efficiency and attainable pull force per watt, over the values attainable with said cylindrical core. The solenoid construction of FIG. 2 has structural and magnetic features in common with the combination of FIG. 1, and is directly usable therewith, the foregoing valve description thus being applicable to FIG. 2.

Figure 3:
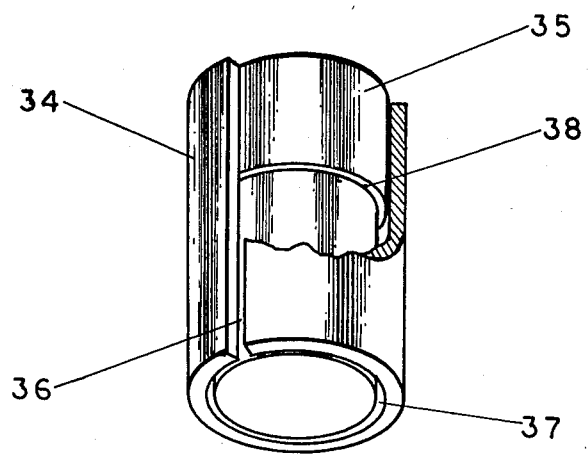
FIG. 3 is an enlarged partially sectioned view showing key details of the core assembly of FIG. 2.

The two-piece core 34 and 35 makes use of the discovered fact that hysteresis and eddy-currents in flux carrying core portions may be economically and efficiently used to obtain phase retardation and resultant phase-splitting in A.C. devices in lieu of shading rings heretofore used for that purpose. The core assembly including soft iron outer sleeve 34, and mild steel inner cylindrical member 35 is shown in section in FIG. 2, and also in enlarged section in FIG. 3 which discloses the annular and peripheral gap means which contribute to the phase-splitting function, and high magnetic efficiency characteristic of the core assembly.

For detailed discussion of this phase-splitting core arrangement, reference is made to my prior U.S. Pat. Nos. 3,553,618, or 3,647,177, incorporated by reference as part hereof.

During development of the present invention, a nonmagnetic housing 3 was constructed for comparison purposes. It was in all dimensions identical with the foregoing ferro-magnetic housing but was in accordance with prior art valve practice, being constructed of 18-8 stainless steel. Tests performed with this nonmagnetic housing in the valve construction of FIG. 1 disclosed a substantial performance advantage in terms of pull-force per watt, over a commercial prior art water valve. The test values are disclosed in a comparative performance table which follows below.

This starting improvement is believed to derive from the novel structure and elements as disclosed in combination including the short-gap solenoid; the split-path magnetic circuit having low reluctance and eddy-current susceptibility; and the above described liquid motion-damping effect. The foregoing is an initial improvement which should be taken into account in evaluating the further advantages contributed by my ferromagnetic armature housing, and phase-splitting core.

In the absence of mathematical expressions reliably applicable to the present invention, an experimental test program was undertaken to provide a basis for mathematical definition, and to establish optimum or near-optimum dimensions, materials, and size ratios for a water valve application similar to FIGS. 1, and 2. A flow rate of 1.0 g.p.m. was chosen at a water gauge pressure of 60 p.s.i. with operation on 115 v. 60 H.A.C. Diameter of fluid passage 24 was established as 0.072", and an armature travel of 0.063 was chosen, thus setting the axial dimension of armature gap 8 at 0.063". An armature open-gap (inrush) pull requirement of 10 oz. was established to allow a reserve over the maximum load values to be met.

The following dimensions and size ratios were established:

Coil spool 28, length o.a. 0.820", winding length 0.760".
Coil 27, 39—t. #39 or 40 B&S ga. copper, weight 11, or 8 grams.
Core 30, 0.600" long, 0.437" dia., magnetic ingot iron.
Core sleeve 34, 0.600" long, 0.437" dia., 0.062 wall, ingot iron.
Core 35, 0.600" long, dia.'s. 0.296" and 0.316", C-1117 c.r.s.
Housing 3, cup 0.437" o.d., 0.405" i.d., 430 magn. s.s. and 18- 8 s.s.
Magn. shell 31, 12 ga.×0.812" w. 1012 h.r.s. Butt at top center.
Armature 1, dia. 0.395" to 0.40". plunger length 0.325", 430 s.s.

For evaluation purposes a numerical performance factor of merit "P" was devised as an expression of open-gap pull in ounces attainable, per watt of steady-state electrical input. For the present examples "P" becomes 10 (oz) divided by the measured input Watts (w.) for the closed gap steady-state condition. A commercial prior art water valve of similar capacity was included in the test series as a comparison base, with the supply voltage adjusted to obtain 10 oz. of open gap armature pull at inrush current. At that voltage it consumed 16 watts steady-state, for a value "P"=0.625.

Values obtained for the present invention were:
Assembly of FIG. 1, non-magnetic housing 3, w.=9.50, P=1.05.
Assembly of FIG. 2, non-magnetic housing 3, w.=7.80, P=1.28.
Assembly of FIG. 1, magnetic housing 3, w.=5.85, P=1.71.
Assembly of FIG. 2, magnetic housing 3, w.=3.10, P=3.22.

The use in this invention of hysteretic materials has been found not to cause difficulties with "sticking armature" due to remanence or residual flux. Annealing of outer shell 31 after forming is desirable, however, attention to the force and rate of spring 2 has provided freedom from residual flux problems. It thus appears that magnetic housing 3 serves beneficially as a saturable magnetic shunt, bypassing around armature 1 a major portion of the residual flux arising in parts such as core 30, shell 31, or core 35. This is a further benefit accruing to the present invention.

From the foregoing it will be apparent that I have provided novel, simple, and economical means of attaining the objects and advantages recited.

Having described my invention, I claim:

1. A solenoid fluid valve of the class used for control of the flow of gases or liquids under pressure in a closed system including in combination:

valve body means having a fluid duct therethrough, valve seat means intermediate said duct having a fluid passage therethrough forming a flow orifice; and adjacent solenoid operating means having a coil with a ferrous core and a ferrous plunger armature extending therein, an end of said core forming a planar magnetic pole juxtaposed one end of said armature, and a ferrous structure exterior of said coil forming with said core and said armature a loop magnetic circuit; and said armature having a portion adapted for sealing engagement with said orifice, and being operatively disposed within a unitary housing extending within said coil;

the improvement thereof comprising, an armature housing of tubular construction having one end closed by a transverse diaphragm portion and extending within said coil with said diaphragm portion substantially abutting said planar end of said core and defining the energized limit of travel of said armature effected by striking directly thereagainst; and said housing being constructed of thin ferrous material of substantially the same wall thickness throughout the tubular length thereof; and arranged as a saturable magnetic shunt or shield acting to divert and bypass around said armature a major portion of the residual flux persisting in said loop magnetic circuit after deenergization of said solenoid.

2. A solenoid fluid valve as set forth in claim 1 wherein; said loop magnetic circuit embodies magnetic phase splitting means of the class having plural spaced magnetically parallel discrete ferrous flux paths of composite construction, said paths being relatively disparate in the electro-magnetic properties thereof including magnetic hysteresis and eddy-current susceptibility.

* * * * *